United States Patent
Qi et al.

(10) Patent No.: US 10,316,392 B2
(45) Date of Patent: Jun. 11, 2019

(54) METHOD FOR CONVERTING AND SEPARATING VANADIUM, TITANIUM, AND IRON FROM VANADIUM-TITANIUM-IRON CONCENTRATE IN ONE STEP

(71) Applicant: Institute of Process Engineering, Chinese Academy of Sciences, Beijing (CN)

(72) Inventors: Tao Qi, Beijing (CN); Desheng Chen, Beijing (CN); Lingyun Yi, Beijing (CN); Lina Wang, Beijing (CN); Hongxin Zhao, Beijing (CN); Yahui Liu, Beijing (CN); Weijing Wang, Beijing (CN); Hongdong Yu, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 116 days.

(21) Appl. No.: 15/406,804

(22) Filed: Jan. 16, 2017

(65) Prior Publication Data
US 2017/0218479 A1    Aug. 3, 2017

(30) Foreign Application Priority Data
Dec. 9, 2015    (CN) .......................... 2015 1 0903560

(51) Int. Cl.
*C22B 34/22*    (2006.01)
*C21B 11/00*    (2006.01)
(Continued)

(52) U.S. Cl.
CPC .............. *C22B 34/22* (2013.01); *C21B 11/00* (2013.01); *C21B 15/00* (2013.01);
(Continued)

(58) Field of Classification Search
CPC ........... C21B 11/00; C21B 15/02; C22B 3/06; C22B 3/22; C22B 5/10; C22B 34/1204;
(Continued)

(56) References Cited

FOREIGN PATENT DOCUMENTS

| CN | 103757199 | * | 4/2014 |
| CN | 105671306 | * | 6/2016 |
| CN | 105734266 | * | 7/2016 |

OTHER PUBLICATIONS

CN 105671306 Machine translation of the description. (Year: 2016).*

(Continued)

*Primary Examiner* — Tima M McGuthry-Banks
(74) *Attorney, Agent, or Firm* — Gokalp Bayramoglu

(57) ABSTRACT

The present invention relates to a method for converting and separating vanadium, titanium, and iron from the vanadium-titanium-iron concentrate in one step, which includes the steps as below. (1) The vanadium-titanium-iron concentrate is mixed and roasted together with addition agent and reducing agent, and thereby vanadium-containing pig iron and vanadium enriched slag are obtained. (2) The vanadium titanium enriched slag is leached in water and filtered, and thereby vanadium-containing solution and titanium slag are obtained. The technical features of the present invention are as below. By the new process of sodium reduction coupling, a new system of low-temperature smelting multiphase reaction separation is constructed. The reduction of iron, sodiumizing of vanadium, and the melting separation process of the vanadium titanium enriched slag and the iron are achieved in one step. Three products, i.e., the vanadium-containing pig iron, the vanadium-containing solution, and the titanium slag are produced.

6 Claims, 1 Drawing Sheet

(51) Int. Cl.
  *C21B 15/00* (2006.01)
  *C22B 34/12* (2006.01)
  *C01G 31/00* (2006.01)
  *C01G 23/04* (2006.01)
  *C01G 23/047* (2006.01)

(52) U.S. Cl.
  CPC .......... *C22B 34/1204* (2013.01); *C01G 23/04* (2013.01); *C01G 23/047* (2013.01); *C01G 31/00* (2013.01)

(58) Field of Classification Search
  CPC ...... C22B 34/22; C01G 23/04; C01G 23/047; C01G 31/00
  See application file for complete search history.

(56) References Cited

OTHER PUBLICATIONS

CN 105734266 Machine translation of the description. (Year: 2016).*
CN 103757199 Machine translation of the description. (Year: 2014).*

* cited by examiner

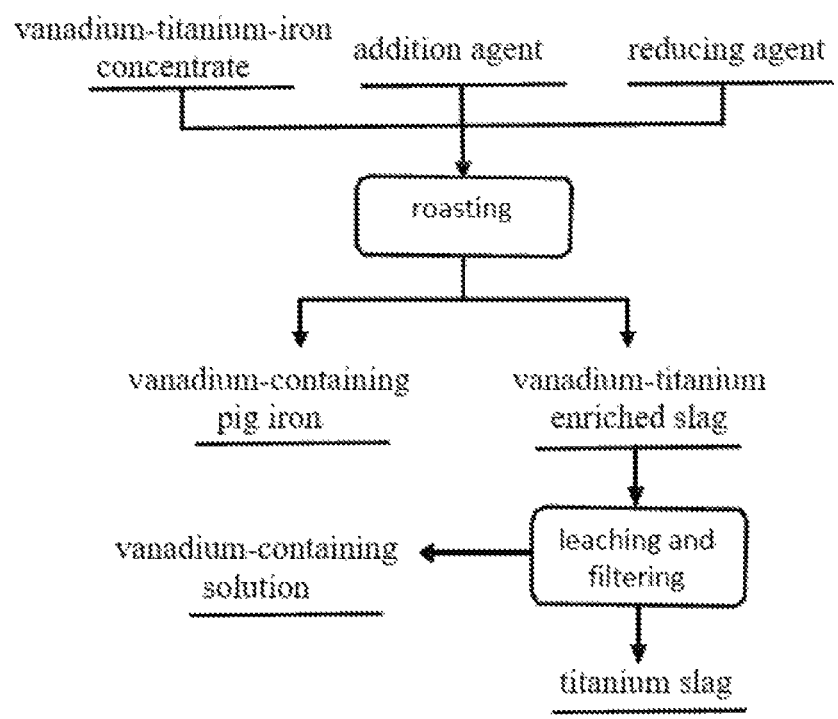

METHOD FOR CONVERTING AND SEPARATING VANADIUM, TITANIUM, AND IRON FROM VANADIUM-TITANIUM-IRON CONCENTRATE IN ONE STEP

CROSS REFERENCE TO RELATED APPLICATIONS

This application is based upon and claims priority to Chinese Patent Application No. 201510903560.2 filed on Dec. 9, 2015, the entire contents of which are incorporated herein by reference.

TECHNICAL FIELD

The present invention relates to the field of comprehensive utilization of metallurgical technology and mineral resources, in particular, to a method for converting and separating the vanadium, the titanium, and the iron from the vanadium-titanium-iron concentrate in one step.

BACKGROUND

Around the world, nowadays, the methods of utilizing the vanadium-titanium-iron concentrate are as below. (1) The process of blast furnace-converter can only extract the iron and a part of vanadium, while the titanium enters the blast furnace slag and cannot be effectively and economically recovered and utilized. A large amount of blast furnace titanium slag that is additionally produced causes a huge drain of titanium resources and serious environmental pollution. (2) In the process of rotary hearth furnace-electrical furnace, the vanadium-bearing titano-magnetite is firstly pre-reduced in a rotary hearth furnace, and then is melted and separated by the electrical furnace, such that hot metal and the titanium enriched slag are obtained. However, the location of vanadium is hard to control, and the utilization rate of the vanadium is not high. Also, the mineral phase of the melting-separated titanium slag is stable, and has a compact structure. There is no mature process to deal with melting-separated titanium slag at present. Only a small amount of melting-separated titanium slag is used as a raw material to produce titanium dioxide pigment in sulfate process. (3) The process of direct reduction and grinding beneficiation achieves the separation of iron and vanadium-titanium, and obtains iron powder and vanadium-titanium enriched slag. The vanadium-titanium enriched slag is further subjected to the process of sodium salt roasting. The vanadium is extracted by water leaching. The vanadium solution and the titanium enriched slag are obtained. (4) In the process which firstly extracts the vanadium, the vanadium-titanium-iron concentrate firstly is subjected to the process of sodium salt roasting and water leaching extraction of vanadium. Next, the iron making process with the blast furnace or the non-blast furnace is conducted. After the vanadium extraction, since the content of residual sodium is high, the smooth conduction of the process of iron making is negatively affected. Also, the obtained titanium slag still cannot be utilized as in above processes. Moreover, these processes require conducting two or three high-temperature steps to achieve the effective separation of the iron, the vanadium, and the titanium. There are defects of a long process, a high investment, a high cost, serious pollution, and a low comprehensive utilization degree. In view of the above, no matter what kind of usage is conducted, the recovering and utilization of the iron, the vanadium, and the titanium from the vanadium-bearing titano-magnetite cannot be achieved simultaneously, which causes a waste of resources. The present invention provides a new method for converting and separating the vanadium, the titanium, and the iron from the vanadium-titanium-iron concentrate in one step. An efficient and clean recovery of the vanadium, the titanium, and the iron is achieved. The method has the significant advantages of the short process, low investment, low production cost, reduced environmental pollution, the efficiency of comprehensive recovery, and has a wide application prospect.

SUMMARY

Regarding the defects of the existing processes that include two or three steps to make comprehensive utilization of the vanadium-titanium-iron concentrate, the present invention develops a method for converting and separating vanadium, titanium, and iron from vanadium-titanium-iron concentrate in one step. Meanwhile, the method has the significant advantages of reduced environmental pollution, high comprehensive recovery rate, and has a wide application prospect.

The method for converting and separating vanadium, titanium, and iron from the vanadium-titanium-iron concentrate in one step provided by the present invention includes the following steps.

(1) The vanadium-titanium-iron concentrate is mixed with an addition agent and a reducing agent. Roasting is conducted for 0.5-4 hours at the temperature of 1100-1400° C., so that the vanadium-containing pig iron and the vanadium titanium enriched slag are achieved, wherein the ratio by weight is vanadium-titanium-iron concentrate:addition agent:reducing agent=100:(40-80):(20-50).

(2) The vanadium titanium enriched slag obtained in the step (1) is leached in water and filtered, and thereby the vanadium-containing solution and the titanium slag are obtained.

The method according to claim 1 is characterized in that the vanadium-titanium-iron concentrate in the step (1) can be any type of vanadium-titanium-iron concentrate known in the art. The major compositions include the iron with a total mass fraction of 30%-60%, $V_2O_5$ with a mass fraction of 0.15%-2.0%, and $TiO_2$ with a mass fraction of 5%-35%.

In the method according to the present invention, the addition agent of step (1) is one item or a mixture of more than one items selected from a group consisting of sodium carbonate, sodium hydroxide, sodium sulfate, sodium chloride, sodium borate, and sodium bicarbonate.

In the method according to the present invention, the reducing agent of the step (1) is one item or a mixture of more than one items selected from a group consisting of anthracite, bituminous coal, brown coal, and coke.

In the method according to the present invention, the vanadium-containing pig iron in the step (1) has an iron mass fraction of 90%-98%, and a vanadium mass fraction of 0.05%-1%.

The method according to the present invention, preferably, the leaching liquid-solid ratio in the step (2) is 1:1-5:1, and the leaching temperature is 30-100° C., and the leaching time is 0.5-4 hours.

The technical processes in the prior art need to conduct two or even three high-temperature steps to achieve the separation of vanadium, titanium, and iron. Specifically, the process of blast furnace-converter can only extract the iron and a part of vanadium, while the titanium enters the blast furnace slag and cannot be effectively and economically recovered. In the process of the direct reduction-electric furnace, the whereabouts of vanadium is hard to control, and the titanium slag is hard to be utilized. There are problems of long process and low recovery rate of the valuable components.

The technical features of the present invention are as below. By the new process of sodium salt roasting and reduction coupling, a new system of low-temperature smelting multiphase reaction separation is constructed. The reduction of iron, the sodiumizing of vanadium, and the melting separation process of the vanadium titanium enriched slag and the iron is achieved in one step. Three products, i.e., vanadium-containing pig iron, vanadium-containing solution, and titanium slag are produced. A new, efficient, and economical process of comprehensive utilization of vanadium-titanium-iron concentrate is created. Compared with the traditional "blast furnace-converter" or "direct reduction-melting separation/grinding beneficiation" processes, the present invention has the significant advantages of a short process, a low investment, a low production cost, little environmental pollution, and a high comprehensive recovery rate. A new technology of efficient and comprehensive utilization of vanadium-titanium-iron mineral resources is provided, which has a wide application prospect.

The specific advantages of the present invention are as below.

(1) The present invention provides a new method for converting and separating vanadium, titanium, and iron from vanadium-titanium-iron concentrate in one step, avoiding problems of repeated high-temperature roasting, a high cost, and a serious pollution in the traditional smelting process of the vanadium-bearing titano-magnetite.

(2) The present invention provides a new method for converting and separating vanadium, titanium, and iron from the vanadium-titanium-iron concentrate in one step. The recovery rates of the iron, the vanadium, and the titanium are high. The iron is produced as vanadium-containing pig iron which has a high additional value, and the obtained titanium slag has good acid soluble ability.

BRIEF DESCRIPTION OF THE DRAWINGS

FIG. 1 is the process flow chart of the method for converting and separating vanadium, titanium, and iron from vanadium-titanium-iron concentrate in one step of the present invention.

DETAILED DESCRIPTION

Further description of the present invention in conjunction with specific embodiments will be described as below.

Embodiment 1

100 parts of 1 # vanadium-titanium-iron concentrate, 40 parts of sodium carbonate, and 20 parts of anthracite are well mixed. Then, the mixture is kept for 3 hours in a muffle furnace at temperature of 1200° C. Vanadium-containing pig iron and vanadium titanium enriched slag are obtained. The vanadium titanium enriched slag is crushed and finely grounded, and is leached for 2 hours under the condition of 30° C. and a liquid-solid ratio of 2:1. Filtering is conducted, after which the vanadium-containing solution and the titanium enriched slag are obtained. The chemical compositions of the vanadium-titanium-iron concentrate are shown in table 1. The separating results of the vanadium-containing pig iron, the vanadium-containing solution, and the titanium enriched slag are shown in table 2. The iron grade of the obtained vanadium-containing pig iron is 97.62%, and the recovery rate is up to 99.40%. The concentration of the vanadium-containing solution $V_2O_5$ is 3.2 g/L, and the recovery rate of vanadium is 70.46%. The $TiO_2$ grade of the titanium enriched slag is 35.67%, and the recovery rate of titanium is 99.77%. The conversion and separation of iron, vanadium, and titanium from vanadium-titanium-iron concentrate are well achieved.

Embodiment 2

100 parts of 2 # vanadium-titanium-iron concentrate, 60 parts of sodium bicarbonate and 30 parts of coke are well mixed. Then, the mixture is kept for 4 hours in a muffle furnace at temperature of 1100° C. The vanadium-containing pig iron and vanadium titanium enriched slag are obtained. The vanadium titanium enriched slag is crushed and finely grounded, and is leached for 2 hours under the condition of 30° C. and a liquid-solid ratio of 1:1. Filtering is conducted, after which the vanadium-containing solution and the titanium enriched slag are obtained. The chemical compositions of vanadium-titanium-iron concentrate are shown in table 1. The separating results of the vanadium-containing pig iron, the vanadium-containing solution, and the titanium enriched slag are shown in table 2. The iron grade of the obtained vanadium-containing pig iron is 95.38%, and the recovery rate is up to 98.71%. The concentration of the vanadium-containing solution $V_2O_5$ is 5.2 g/L, and the recovery rate of vanadium is 90.50%. The $TiO_2$ grade of the titanium enriched slag is 42.67%, and the recovery rate of titanium is 99.54%. The conversion and separation of iron, vanadium, and titanium from vanadium-titanium-iron concentrate are well achieved.

Embodiment 3

100 parts of 3 # vanadium-titanium-iron concentrate, 70 parts of sodium sulfate, and 40 parts of bituminous coal are well mixed. Then, the mixture is kept for half an hour in a muffle furnace at temperature of 1300° C. Vanadium-containing pig iron and vanadium titanium enriched slag are obtained. The vanadium titanium enriched slag is crushed and finely grounded, and is leached for half an hour under the condition of 100° C. and a liquid-solid ratio of 4:1. Filtering is conducted, after which the vanadium-containing solution and the titanium enriched slag are obtained. The chemical s of vanadium-titanium-iron concentrate are shown in table 1. The separating results of the vanadium-containing pig iron, the vanadium-containing solution, and the titanium enriched slag are shown in table 2. The iron grade of the obtained vanadium-containing pig iron is 96.54%, and the recovery rate is up to 99.10%. The concentration of the vanadium-containing solution $V_2O_5$ is 4.5 g/L, and the recovery rate of vanadium is 88.56%. The $TiO_2$ grade of the titanium enriched slag is 39.52%, and the recovery rate of titanium is 99.61%. The conversion and separation of iron, vanadium, and titanium from vanadium-titanium-iron concentrate are well achieved.

Embodiment 4

100 parts of 4 # vanadium-titanium-iron concentrate, 80 parts of mixture of sodium carbonate and sodium sulfate (mol($Na_2CO_3$/NaCl)=1:1), and 40 parts of brown coal are well mixed. Then, the mixture is kept for 2 hours in a muffle furnace at temperature of 1400° C. Vanadium-containing pig iron and vanadium titanium enriched slag are obtained. The vanadium titanium enriched slag is crushed and finely grounded, and is leached for 1 hour under the condition of 90° C. and a liquid-solid ratio of 3:1. Filtering is conducted, after which the vanadium-containing solution and the titanium enriched slag are obtained. The vanadium-titanium-iron concentrates are shown in table 1. The separating results of the vanadium-containing pig iron, the vanadium-containing solution, and the titanium enriched slag are shown in table 2. The iron grade of the obtained vanadium-containing pig iron is 97.38%, and the recovery rate is up to 99.85%. The concentration of the vanadium-containing solution $V_2O_5$ is 2.8 g/L, and the recovery rate of vanadium is 80.30%. The $TiO_2$ grade of the titanium enriched slag is 46.69%, and the recovery rate of titanium is 99.74%. The conversion and separation of iron, vanadium, and titanium from vanadium-titanium-iron concentrate are well achieved.

Embodiment 5

100 parts of 5 # vanadium-titanium-iron concentrate, 50 parts of sodium hydroxide, and 30 parts of anthracite are well mixed. Then, the mixture is kept for 1 hour in a muffle furnace at temperature of 1250° C. The vanadium-containing pig iron and the vanadium titanium enriched slag are obtained. The vanadium titanium enriched slag is crushed and finely grounded, and is leached for 3 hours under the condition of 70° C. and a liquid-solid ratio of 5:1. Filtering is conducted, after which the vanadium-containing solution and the titanium enriched slag are obtained. The chemical of vanadium-titanium-iron concentrate are shown in table 1. The separating result of the vanadium-containing pig iron, the vanadium-containing solution, and the titanium enriched slag are shown in table 2. The iron grade of the obtained vanadium-containing pig iron is 97.02%, and the recovery rate is up to 98.60%. The concentration of the vanadium-containing solution $V_2O_5$ is 4.1 g/L, and the recovery rate of vanadium is 86.22%. The $TiO_2$ grade of the titanium enriched slag is 48.12%, and the recovery rate of titanium is 99.73%. The conversion and separation of iron, vanadium, and titanium from vanadium-titanium-iron concentrate are well achieved.

Embodiment 6

100 parts of 6 # vanadium-titanium-iron concentrate, 70 parts of a mixture of sodium carbonate and sodium chloride (mol($Na_2CO_3$/NaCl)=1:1), and 30 parts of coke are well mixed. Then, the mixture is kept for 2 hours in a muffle furnace at temperature of 1300° C. The vanadium-containing pig iron and the vanadium titanium enriched slag are obtained. The vanadium titanium enriched slag is crushed and finely grounded, and is leached for 1 hour under the condition of 90° C. and a liquid-solid ratio of 4:1. Filtering is conducted, after which the vanadium-containing solution and the titanium enriched slag are obtained. The chemical of vanadium-titanium-iron concentrate are shown in table 1. The separating results of the vanadium-containing pig iron, the vanadium-containing solution, and the titanium enriched slag are shown in table 2. The iron grade of the obtained vanadium-containing pig iron is 98.12%, and the recovery rate is up to 99.85%. The concentration of the vanadium-containing solution $V_2O_5$ is 4.7 g/L, and the recovery rate of vanadium is 83.40%. The $TiO_2$ grade of the titanium enriched slag is 40.67%, and the recovery rate of titanium is 99.01%. The conversion and separation of iron, vanadium and titanium from vanadium-titanium-iron concentrate are well achieved.

TABLE 1

Analysis of six vanadium-titanium-iron concentrates in the embodiments/%

| Ore sample number | TFe | $TiO_2$ | $V_2O_5$ | $SiO_2$ | $Al_2O_3$ | CaO | MgO |
|---|---|---|---|---|---|---|---|
| 1 | 50.28 | 13.12 | 0.53 | 3.07 | 6.17 | 1.04 | 3.77 |
| 2 | 37.45 | 28.85 | 1.23 | 12.37 | 2.62 | 6.75 | 0.99 |
| 3 | 45.38 | 18.58 | 1.52 | 8.66 | 2.56 | 3.27 | 0.88 |
| 4 | 55.33 | 8.65 | 0.35 | 4.60 | 4.52 | 2.01 | 0.60 |
| 5 | 30.06 | 32.47 | 1.03 | 14.37 | 3.02 | 6.95 | 1.29 |
| 6 | 59.58 | 6.23 | 1.86 | 2.13 | 2.65 | 1.01 | 0.57 |

TABLE 2

Reaction and separation results of the "one-step method" of six vanadium-titanium-iron concentrates in the embodiments

| Ore sample number | Product name | Grade/% | | | Recovery/% | | |
|---|---|---|---|---|---|---|---|
| | | TFe | $TiO_2$ | $V_2O_5$ | Fe | $TiO_2$ | $V_2O_5$ |
| 1 | Vanadium-containing Pig iron | 97.62 | 0.20 | 0.21 | 99.40 | 0.23 | 19.35 |
| | Vanadium-containing solution | — | — | 3.2 g/L | — | — | 70.46 |
| | Titanium enriched slag | 0.66 | 35.67 | 0.16 | 0.60 | 99.77 | 10.19 |
| 2 | Vanadium-containing Pig iron | 95.38 | 0.32 | 0.24 | 98.71 | 0.46 | 5.42 |
| | Vanadium-containing solution | — | — | 5.2 g/L | — | — | 90.50 |
| | Titanium enriched slag | 0.81 | 42.67 | 0.25 | 1.79 | 99.54 | 4.08 |
| 3 | Vanadium-containing Pig iron | 96.54 | 0.26 | 0.30 | 99.10 | 0.39 | 7.05 |
| | Vanadium-containing solution | — | — | 4.5 g/L | — | — | 88.56 |
| | Titanium enriched slag | 0.52 | 39.52 | 0.22 | 0.90 | 99.61 | 4.39 |
| 4 | Vanadium-containing Pig iron | 97.38 | 0.25 | 0.52 | 99.85 | 0.26 | 15.82 |
| | Vanadium-containing solution | — | — | 2.8 g/L | — | — | 80.30 |
| | Titanium enriched slag | 0.51 | 46.69 | 0.17 | 0.29 | 99.74 | 3.68 |
| 5 | Vanadium-containing Pig iron | 97.02 | 0.30 | 0.38 | 98.60 | 0.27 | 10.05 |
| | Vanadium-containing solution | — | — | 4.1 g/L | — | — | 86.22 |
| | Titanium enriched slag | 0.32 | 48.12 | 0.17 | 1.40 | 99.73 | 3.73 |
| 6 | Vanadium-containing Pig iron | 98.12 | 0.10 | 0.20 | 99.85 | 0.09 | 10.05 |
| | Vanadium-containing solution | — | — | 4.7 g/L | — | — | 83.40 |
| | Titanium enriched slag | 0.26 | 40.67 | 0.08 | 0.15 | 99.01 | 6.55 |

Moreover, the present invention may also have a variety of embodiments. Artisans who are familiar with the art can make various corresponding modifications and variations based on the disclosure of the present invention without departing from the spirit and substance of the present invention. However, the corresponding modifications and variations should belong to the protective scope of the claims of the invention.

What is claimed is:

1. A method for converting and separating vanadium, titanium and iron from vanadium-titanium-iron concentrate, comprising:
   step 1, Mixing vanadium-titanium-iron concentrate with an addition agent and a reducing agent, conducting roasting for 0.5-4 hours at a temperature of 1100-1400° C., so that vanadium-containing pig iron and vanadium titanium enriched slag are obtained, wherein a ratio by weight is vanadium-titanium-iron concentrate:addition agent:reducing agent=100:(40-80):(20-50);
   step 2, Leaching the vanadium titanium enriched slag obtained in the step 1 in water, conducting filtering, such that a vanadium-containing solution and a titanium slag are obtained.

2. The method of claim 1, wherein major compositions of the vanadium-titanium-iron concentrate in step 1 includes iron with a total mass fraction of 30%-60%, $V_2O_5$ with a mass fraction of 0.15%-2.0%, and $TiO_2$ with a mass fraction of 5%-35%.

3. The method of claim 1, wherein the addition agent in step 1 is one item or a mixture of more than one item selected from a group consisting of sodium carbonate, sodium hydroxide, sodium sulfate, sodium chloride, sodium borate, and sodium bicarbonate.

4. The method of claim 1, wherein the reducing agent in step 1 is one item or a mixture of more than one item selected from a group consisting of anthracite, bituminous coal, brown coal, and coke.

5. The method of claim 1, wherein the vanadium-containing pig iron in step 1 has an iron mass fraction of 90%-98%, and a vanadium mass fraction of 0.05%-1%.

6. The method of claim 1, wherein a leaching liquid-solid ratio in step 2 is 1:1-5:1, a leaching temperature is 30-100° C., and a leaching time is 0.5-4 hours.

* * * * *